United States Patent
Raleigh et al.

(10) Patent No.: US 7,028,807 B2
(45) Date of Patent: Apr. 18, 2006

(54) NON-EXPLOSIVE ACOUSTIC SOURCE

(75) Inventors: Michael Raleigh, Alexandria, VA (US); James Galambos, Alexandria, VA (US); Michael Bohnet, Herndon, VA (US)

(73) Assignee: BAE Systems Advanced Technologies, Inc., Nashua, NH (US)

( * ) Notice: Subject to any disclaimer, the term of this patent is extended or adjusted under 35 U.S.C. 154(b) by 146 days.

(21) Appl. No.: 10/648,841

(22) Filed: Aug. 26, 2003

(65) Prior Publication Data
US 2005/0150714 A1 Jul. 14, 2005

(51) Int. Cl.
G01V 1/06 (2006.01)
G01V 1/38 (2006.01)
G01V 1/157 (2006.01)
G01V 1/116 (2006.01)

(52) U.S. Cl. .................. 181/119; 181/118; 181/110; 181/120; 367/147; 367/171

(58) Field of Classification Search ............... 181/119, 181/118, 116, 110, 120; 367/141, 144, 145, 367/147, 171
See application file for complete search history.

(56) References Cited

U.S. PATENT DOCUMENTS

| | | | |
|---|---|---|---|
| 3,039,559 A * | 6/1962 | Ellsworth | 181/142 |
| 3,430,566 A * | 3/1969 | Patterson | 102/202.6 |
| 3,509,961 A * | 5/1970 | Fitch | 181/115 |
| 4,108,272 A * | 8/1978 | Paitson et al. | 181/120 |
| 4,160,228 A * | 7/1979 | Hix et al. | 73/1.83 |
| 4,193,472 A * | 3/1980 | Kirby | 181/118 |
| 4,296,827 A * | 10/1981 | Thigpen et al. | 181/107 |
| 4,764,906 A * | 8/1988 | Clements et al. | 367/142 |
| 4,798,261 A * | 1/1989 | Chelminski | 181/120 |
| 4,811,815 A * | 3/1989 | Meier et al. | 181/120 |
| 5,864,517 A * | 1/1999 | Hinkey et al. | 367/145 |
| 6,173,803 B1 * | 1/2001 | Barger | 181/102 |
| 2003/0037692 A1 * | 2/2003 | Liu | 102/301 |

FOREIGN PATENT DOCUMENTS

JP 11006698 A * 1/1999

* cited by examiner

Primary Examiner—Edgardo San Martin
(74) Attorney, Agent, or Firm—Rossi, Kimms & McDowell, LLP

(57) ABSTRACT

A non-explosive acoustic source utilizes the combustion of aluminum and water to generate an acoustic pulse. The operation of the non-explosive acoustic source relies on a water/aluminum reaction to generate a burst pressure. The source may be deployed as a single charge or as one element of a multiple charge array and is configurable to explode at variable depths with variable energy levels. The inherent safety of the non-explosive acoustic source obviates the necessity for auxiliary safety features or procedures to protect against inadvertent explosion. As a result, the non-explosive acoustic source facilitates the implementation of sonic detection systems and reduces the operational costs associated with such systems.

5 Claims, 2 Drawing Sheets

NON-EXPLOSIVE ACOUSTIC SOURCE

BACKGROUND

The present invention relates to an acoustic device, and in particular to a device used to generate an underwater acoustic pulse. More specifically, a non-explosive acoustic source is provided that operates as an underwater energy source and is free from the safety hazards inherent to the explosive devices currently used for acoustic charges.

The use of underwater acoustic devices for sonic detection, imaging, communication, and warfare countermeasures is well known in the art. An acoustic source is used to generate energy that will propagate through the surrounding medium and be reflected by objects or features present in the environment. The reflected wave is subsequently captured by a receiving device and analyzed for its spectral characteristics. The time lapse between acoustic pulse and reflected wave reception, the frequency of the reflected wave, and the return signal strength are then used to characterize the reflecting objects. Multiple acoustic devices may be arranged in arrays in order to improve system performance.

In the past, sonic systems have used explosive devices to create the energy required to generate an acoustic pulse. Although very effective for sound wave propagation, explosive devices are by nature inherently dangerous. Such devices often require a design that incorporates safety features to prevent premature detonation. In addition, caution and care must be exercised when handling, packing and transporting the explosive devices to the field of operation. In cases where system requirements mandate the use of a large number of acoustic pulse generators, the additional time, space, and security required to safely pack, store and transport the devices on the designated carrier may significantly hinder or impede system implementation and operation.

In view of the above, it would be desirable to provide an acoustic source that could be used to generate underwater acoustic pulses without the inherent danger associated with conventional explosive devices.

SUMMARY OF INVENTION

The present invention addresses the aforementioned safety concerns associated with explosive acoustic charges by providing a device that performs as an effective acoustic source, but is incapable of exploding unless submerged underwater. A non-explosive acoustic source in accordance with the invention accommodates the combustion of aluminum powder with externally introduced water to produce energy that is released in the form of an acoustic wave. The device is designed to admit water into a combustion chamber only when the device has reached a predetermined water pressure depth. Inside the combustion chamber the water mixes with the aluminum powder. When ignited, the mixture burns until the combustion chamber pressure reaches the predetermined high pressure break point. At that point, the device breaks, releasing the energy and generating an acoustic pulse.

When not in use, the chamber of the present invention contains aluminum powder, which alone, without the presence of an oxidizer, is inert. Consequently, there is no threat of explosion if the device is bumped, tossed, damaged, or otherwise mishandled in storage or transit. Without the presence of water, even inadvertent ignition of the device will not result in an explosion. Because the device is inherently safe when not submerged underwater, there is no need to include additional safety features in the device design, and no need to observe additional safe handling procedures during device deployment. The inherent safety of the present invention facilitates its storage, transport, and deployment, thus increasing the efficiency with which sonar systems can be implemented and operated. Furthermore, because the aluminum powder is not combined with an oxidizer until it is deployed, the device of the present invention has an extended shelf life, further reducing the costs associated with sonic system operation.

The non-explosive acoustic source has a flexible design that accommodates a variety of operational needs. Burst disks can be selected according to the particular depth at which discharge is desired. The end plugs that house the burst disk are interchangeable, allowing the depth at which the device explodes to be altered simply by replacing the original end plug with an end plug containing a bust disk that fractures at the desired depth. Multiple disks of varying burst depths may be arranged in one buoy and deployed in an array in which the disks explode at measured depth intervals.

Other features and advantages of the invention will become apparent to those skilled in the art after review of the following detailed description of the preferred embodiment of the invention and the accompanying drawings.

BRIEF DESCRIPTION OF DRAWINGS

The invention will be described with reference to certain preferred embodiments thereof and the accompanying drawings, wherein:

FIG. 1 is a sectional view of the interior of an non-explosive acoustic source in accordance with a preferred embodiment the invention; and.

DETAILED DESCRIPTION

Figure 1:
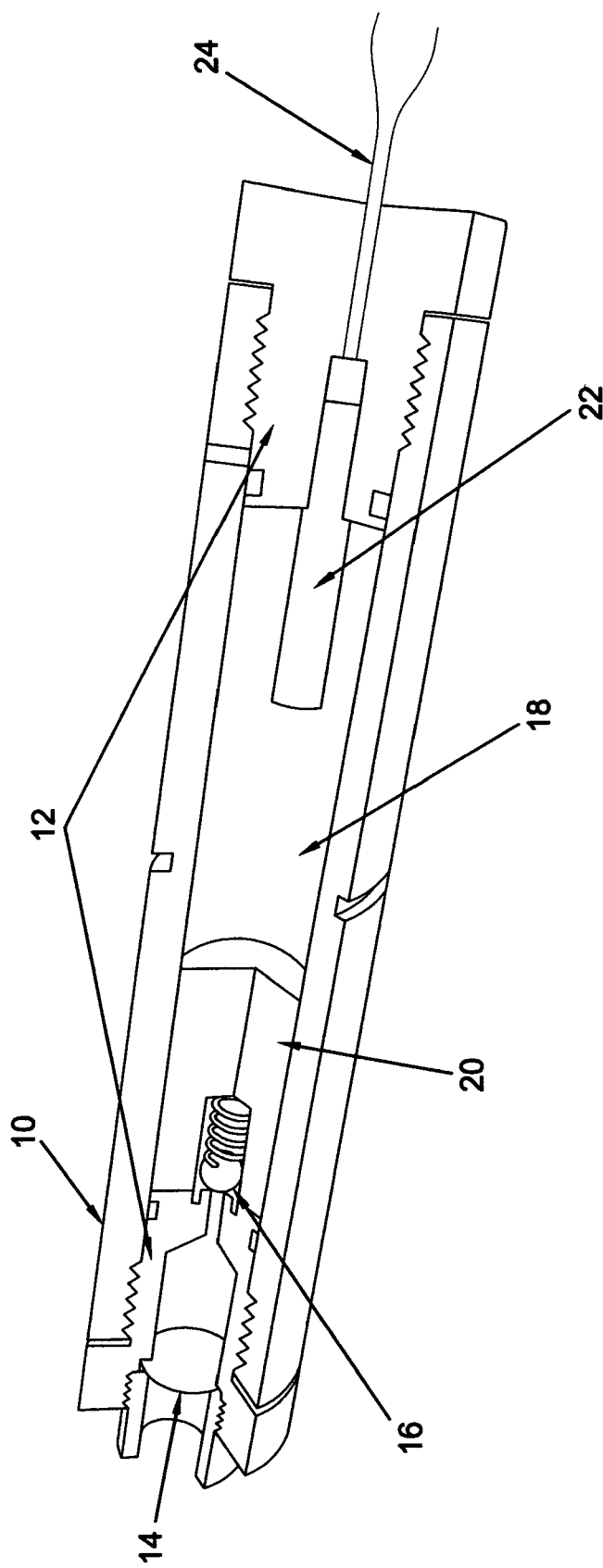

FIG. 1 illustrates a non-explosive acoustic source in accordance with a preferred embodiment of the present invention. The non-explosive acoustic source includes of a heavy wall confinement tube 10, preferably made of standard 4340 steel or advanced alloy steel, wherein two apertures are provided at opposing ends of the confinement tube 10. The two apertures are fitted with end plugs 12, preferably composed of steel. At the first aperture of the confinement tube 10, the end plug 12 includes a burst disk 14, and a ball valve and spring unit 16. The burst disk 14 is designed to rupture when the water pressure external to the confinement tube 10 reaches a predetermined magnitude. At the second aperture of the confinement tube 10, the end plug 12 includes an igniter 22. In the illustrated embodiment, ignition wires 24 extend outward from the end plug 12 that contains the igniter 22. The igniter 22 may be a standard detonator or an electric primer with propellant may be used. The device is not limited to these igniters and other means of ignition may be employed by those skilled in the art.

A combustion chamber 18 is located within the confinement tube 10 in a space enclosed by the end plugs 12. A predetermined amount of aluminum powder 20 is placed within the combustion chamber. The amount of aluminum powder 20 present in the combustion chamber 18 is that amount sufficient to create an acoustic burst of the desired magnitude. In one embodiment 30 g of aluminum is employed to generate an acoustic pulse equivalent to that of a 60 g explosive charge.

When deployed, the non-explosive acoustic source is released into a body of water. The device may be deployed from an aircraft or a marine vessel. Once released, the device will sink until it reaches a depth at which the water pressure equals the predetermined breakpoint pressure of the burst disk 14. At that point, the burst disk 14 fractures, permitting water to enter and apply pressure to the ball valve and spring unit 16. When the ball valve and spring unit 16 is compressed, water is allowed to enter the combustion chamber 18. After the water mixes with the aluminum powder 20 inside the combustion chamber 18, the igniter 22 sparks the combustion of the aluminum-water mixture. The walls of the confinement tube 10 are manufactured to withstand igniter activation without detrimental effects on the combustion chamber 18.

The confinement tube 10 is manufactured with a pre-scored weak point at which the device will break when the internal pressure reaches a predetermined level. The increase in internal pressure due to combustion will reseat the ball valve and spring unit 16. Combustion of the aluminum-water mixture will continue until the breakpoint pressure is attained, at which time the device bursts, releasing an acoustic pulse. In one embodiment of the invention, the pre-scored weak point is located at the center of the device and engineered to burst at a pressure around 75 kpsi. In an alternative embodiment of the invention, the end plugs may be threaded in such a manner that they will shear at a predetermined internal pressure.

The device is preferably designed to be integrated with and operate within the size and energy constraints of an A-size buoy. In one embodiment, the volume of the combustion chamber is 35 cc and contains 30 g of aluminum. Configured in this manner, the non-explosive acoustic source can generate the acoustic energy equivalent of a 60 g explosive charge. With an outer diameter of 0.73 in and a 10 in length, more than thirty non-explosive acoustic sources can be deployed in an A-size buoy when positioned in a hex-pact arrangement. Since the device is scalable, larger energy demands can be satisfied with larger devices.

Figure 2:
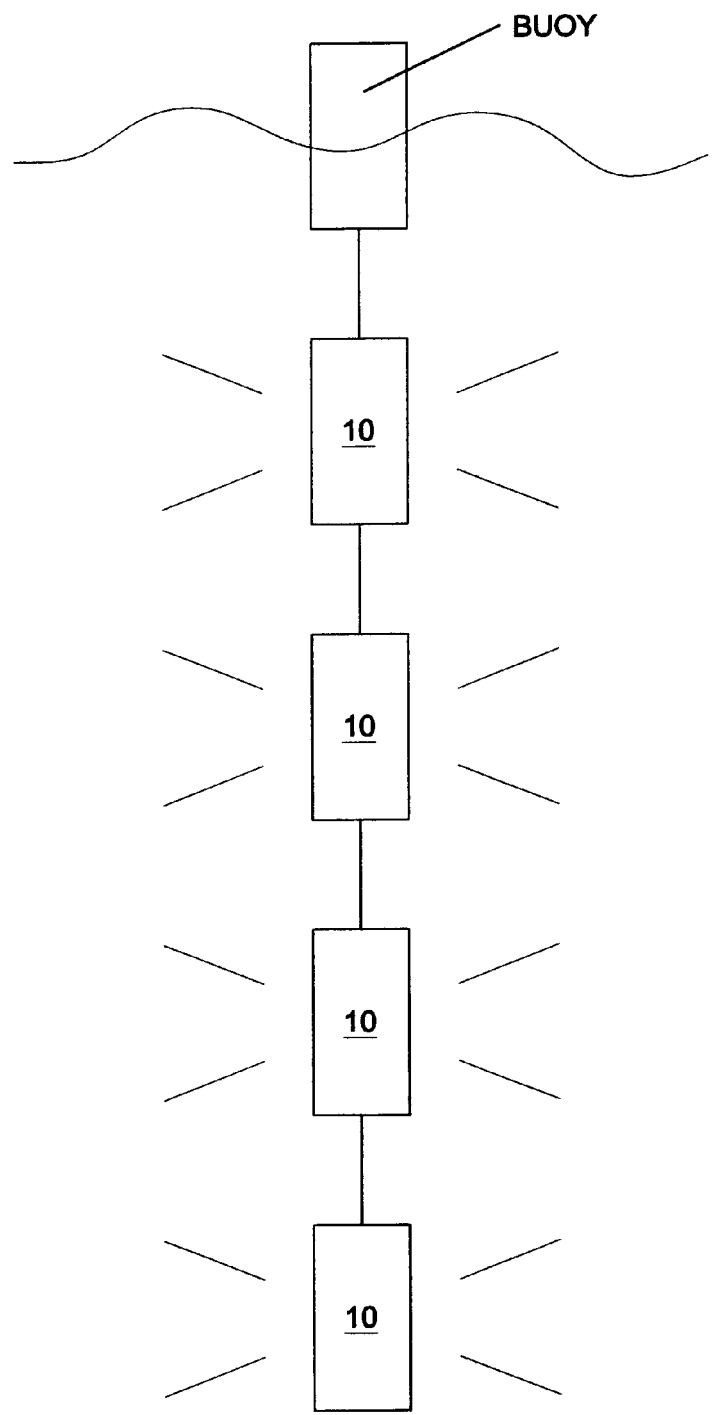
FIG. 2 depicts a vertical array of the non-explosive acoustic sources illustrated in FIG. 1.

The non-explosive acoustic source is deployable as a single point source, or with other devices in an array. When operated as an array, multiple devices, fitted with burst disks designed to burst at varying depths may be deployed within a single buoy as illustrated in FIG. 2. Easily interchangeable end plugs, the versatility to perform as a single source or as an array of multiple sources, and its inherent safety make the non-explosive acoustic device a safe, effective and efficient source of acoustic energy.

The invention has been described with reference to certain preferred embodiments thereof. It will be understood, however, that modifications and variations are possible within the scope of the appended claims.

What is claimed is:

1. A non-explosive acoustic source comprising:
   a confinement tube including apertures at opposing ends thereof and a combustion chamber located between the opposing ends, wherein the combustion chamber includes aluminum powder;
   a first end plug located in a first aperture of the confinement tube, wherein the first end plug includes means for permitting the entry of water into the confinement tube at a specific water pressure;
   a second end plug located in a second aperture of the confinement tube opposite the first aperture, wherein the second end plug includes a detonator.

2. A non-explosive acoustic source as claimed in claim 1, wherein the means for permitting entry of water into the confinement tube comprises a burst disk.

3. A non-explosive acoustic source as claimed in claim 2, wherein the means for permitting entry of water into the confinement tube further comprises a ball valve unit.

4. A non-explosive acoustic source as claimed in claim 1, wherein the confinement tube includes a weak point designed to fracture when subjected to a predetermined internal pressure.

5. A non-explosive acoustic source as claimed in claim 1, wherein at least one of the end plugs is designed to shear at a predetermined internal pressure.

* * * * *